United States Patent [19]
Stecker

[11] Patent Number: 5,904,886
[45] Date of Patent: *May 18, 1999

[54] PROCESS FOR MAKING A MULTI-LAYERED DECORATIVE ARTICLE

[75] Inventor: William M. Stecker, Chapel Hill, N.C.

[73] Assignee: Surface Technologies, Durham, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,716

[22] Filed: Jul. 18, 1996

Related U.S. Application Data

[63] Continuation-in-part of application No. 08/505,455, Jul. 21, 1995.

[51] Int. Cl.⁶ ................................................. B32B 31/22
[52] U.S. Cl. .......................... 264/139; 264/247; 264/255; 264/DIG. 57
[58] Field of Search ...................... 264/DIG. 57, 246, 264/250, 255, 139, 247

[56] References Cited

U.S. PATENT DOCUMENTS

| | | | |
|---|---|---|---|
| 298,358 | 5/1884 | Edge | 264/139 |
| 1,304,083 | 5/1919 | Moore . | |
| 3,150,032 | 9/1964 | Rubenstein | 161/161 |
| 3,562,375 | 2/1971 | Guy et al. | 264/131 |
| 3,784,664 | 1/1974 | Nicklin | 264/246 |
| 4,198,457 | 4/1980 | Saito et al. | 428/161 |
| 4,466,937 | 8/1984 | Johnston et al. | 264/256 |
| 4,528,227 | 7/1985 | Frechtmann | 264/255 |
| 4,622,191 | 11/1986 | Takeuchi | 264/134 |
| 4,624,815 | 11/1986 | Moufarrege | 264/162 |
| 4,650,623 | 3/1987 | Berger | 264/139 |
| 4,844,850 | 7/1989 | Harder | 264/129 |
| 4,889,666 | 12/1989 | Kawasaki | 264/139 |
| 4,959,401 | 9/1990 | Bellasalma et al. | 523/466 |
| 5,166,230 | 11/1992 | Stecker | 523/500 |
| 5,169,573 | 12/1992 | Tsuchida et al. | 264/35 |
| 5,298,212 | 3/1994 | Stecker | 264/571 |

FOREIGN PATENT DOCUMENTS

| | | |
|---|---|---|
| 0 621 575 A1 | 3/1994 | European Pat. Off. . |
| 2 469 263 | 11/1979 | France . |
| 60-145824 | 8/1985 | Japan . |
| 60-224512 | 11/1985 | Japan . |
| 62-149425 | 7/1987 | Japan . |
| 63-295255 | 12/1988 | Japan . |
| 215 9201 | 6/1990 | Japan . |

*Primary Examiner*—Jan H. Silbaugh
*Assistant Examiner*—Edmund H. Lee
*Attorney, Agent, or Firm*—Myers Bigel Sibley & Sajovec, P.A.

[57] ABSTRACT

A decorative, multi-layered article of manufacture is described having a surface with portions of the underlying layers exposed. Multiple layers of curable thermosetting resin are cast into a mold having relief portions therein, wherein each layer has a different color. The resins are cured to form a first laminate with a substantially planar out-of-mold surface and an opposing in-mold surface having relief portions therein. Multiple layers of thermosetting resin are then cast onto the first laminate in-mold surface to follow the relief portions. Each layer has a color different from the other layers. The plurality of resins are then cured to form a second laminate, and such that the first and second laminates form an integral article having a face surface with relief portions therein and an opposing substantially planar back surface. The face surface of the article is then subjected to conditions sufficient to expose portions of the layers of the first and second laminates.

18 Claims, 7 Drawing Sheets

PROCESS FOR MAKING A MULTI-LAYERED DECORATIVE ARTICLE

CROSS REFERENCE TO RELATED APPLICATION

This application is a continuation-in-part of application Ser. No. 08/505,455 filed Jul. 21, 1995, the disclosure of which is hereby incorporated herein by reference.

FIELD AND BACKGROUND OF THE INVENTION

The present invention relates to a process for making a decorative article, and more particularly a multi-layered decorative article.

Solid surface articles have been available for over twenty years. The term "solid surface" relates to a material that has substantially the same physical and aesthetic properties throughout its thickness. Thus, if the surface of the material is sanded or planed, a substantially identical aesthetic is found. Solid surface materials are typically molded out of various thermosetting resins such as unsaturated polyester resins. Various aesthetics are produced such as solid color, marbleized color (see, for example, U.S. Pat. No. 5,166,230 to Stecker) and particulate dispersion (see, for example, U.S. Pat. No. 4,959,401 to Bellasalma et al.).

The limitation of these solid surface materials and the processes for making them are that in order to provide other decorative effects such as patterns, inlays or grooves simulating grout or seams, a highly skilled machinist must manually cut the effect into the solid surface material followed by casting a resin having a contrasting color, for example, into the cut portion to provide the decorative effect. This is time consuming and often is not carried out by the manufacturer but by a craftsman in the field. Moreover, such a technique has limited ability for mass production. Decorative articles used for such things as flooring components, wall components, and table and counter tops and having three-dimensional texture and depth are difficult to mass produce.

Accordingly, there is a need in the art for a process of providing a decorative article and, particularly, a multi-layered, three-dimensional decorative article that is economical to produce and capable of being produced in mass quantities without sacrificing aesthetic appeal.

SUMMARY OF THE INVENTION

It is therefore an object of the present invention to produce a decorative article having three-dimensional texture and depth that is capable of being mass produced.

It is another object of the present invention to produce a multi-colored decorative article that is capable of being mass produced.

These and other objects are accomplished, according to one aspect of the present invention, by a process for making a decorative article of manufacture. A first layer of a first curable thermosetting resin is cast into a mold having relief portions therein, such that the first layer has an out-of-mold surface with relief portions therein. A second layer of a second curable thermosetting resin is cast onto the out-of-mold surface of the first layer to follow the relief portions therein. The second layer has an out-of-mold surface with relief portions therein, and has a color different from the first resin. A third layer of a third curable thermosetting resin is cast onto the out-of-mold surface of the second layer to follow the relief portions therein. The third layer has an out-of-mold surface with relief portions therein, and has a color different from the first and second resins. Together, the first, second, and third layers comprise a laminate article. Next, the first, second, and third resins are cured, and the laminate is removed from the mold. The out-of-mold surface of the third layer is then subjected to conditions sufficient to expose portions of the first, second, and third layers. This may include sanding the out-of-mold surface of the third layer to expose portions of the first, second, and third layers.

Typically, the resins of each layer are the same and are selected from the group consisting of unsaturated polyesters, epoxies, phenolics and polyurethanes, and blends and mixtures thereof. Curing may occur at temperatures of about 100° C. to 150° C. at 80 to 1000 psi., or at temperatures of between about 15° C. and 38° C.

According to another aspect of the present invention, a solid panel is placed onto the out-of-mold surface of the second layer. The panel has an out-of-mold surface that is substantially planar, and together, the first and second layers and the panel comprise a laminate article. The solid panel is typically formed from material such as polyvinyl chloride.

According to another aspect of the present invention, a process for making a decorative article of manufacture includes casting into a mold having relief portions therein a plurality of layers of curable thermosetting resin to follow the relief portions, wherein each layer has a different color. The resins are cured to form a first laminate with a substantially planar out-of-mold surface and an opposing in-mold surface having relief portions therein. The first laminate is then removed from the mold. A plurality of layers of thermosetting resin are then cast onto the first laminate in-mold surface to follow the relief portions. Each layer has a color different from the other layers. The plurality of resins are then cured to form a second laminate, and such that the first and second laminates form an integral article having a face surface with relief portions therein and an opposing substantially planar back surface. The face surface of the article is then subjected to conditions sufficient to expose portions of the layers of the first and second laminates.

By utilizing the processes of the present invention, various decorative articles can be produced having a myriad of aesthetic designs on their face surface. Moreover the processes of the present invention are economical and capable of being performed in mass production. Exemplary decorative articles include architectural facing, exterior and interior wall panels, bathroom fixtures, articles having simulated grout, counter tops, table tops and the like. Also, highly detailed inlays may be produced from "bas-relief" molds with two or more colors as inlays.

The present invention is advantageous for several reasons. By forming decorative articles in layers, resins having different physical and chemical properties can be used cost effectively. For example, the exposed or face layer can be a relatively thin layer of resin having superior physical properties, such as hardness, fire retardency, and the like. A second layer beneath the face layer can then be formed from a relatively thicker layer of lower quality and, therefore, lower cost resin. Additionally, a higher strength resin, such as one that is fiber-reinforced, can be used for the underlying layer(s). By using multiple layers, a lower cost (and/or higher strength) decorative article can be produced that has physical and chemical properties similar to that of an article made from expensive (and/or lower strength) single layer resin. In addition, because the individual resin layers do not co-mingle, the resulting designs on the face surface are very precise and pleasing.

DETAILED DESCRIPTION OF THE PREFERRED EMBODIMENTS

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

Figure 1:
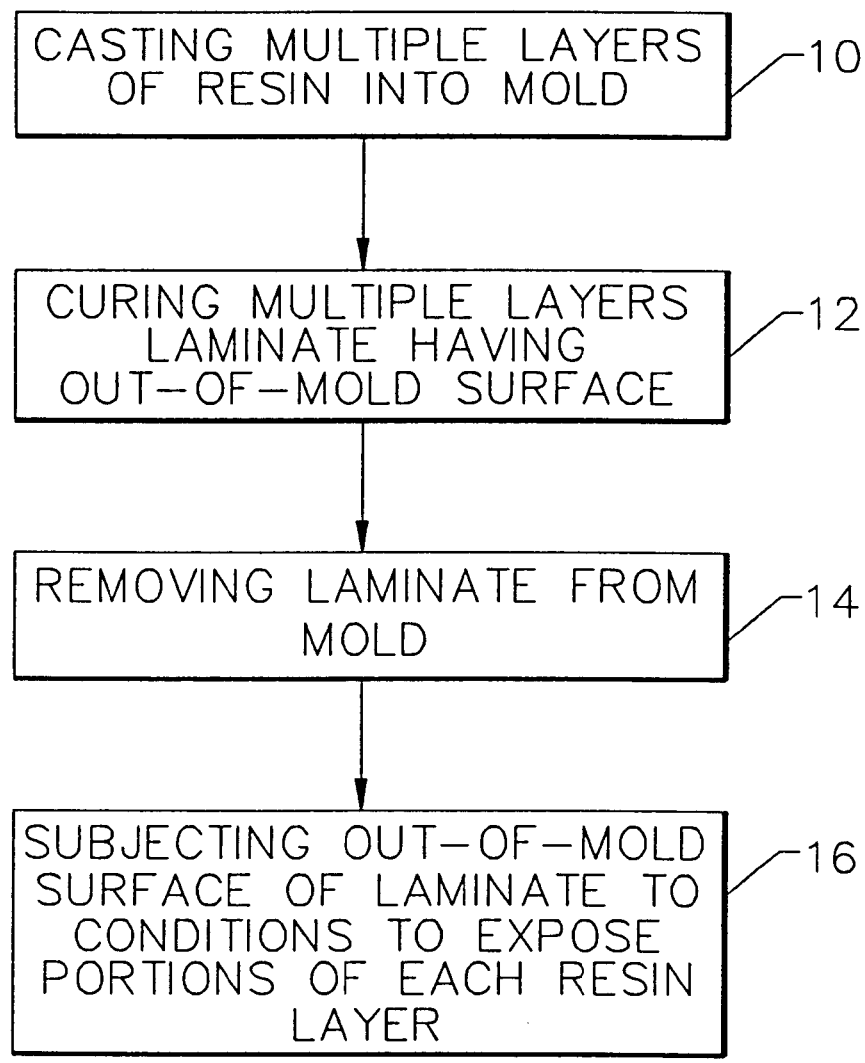
FIG. 1 is a flow diagram illustrating the steps of a method of making a decorative article according to one aspect of the present invention.
Figure 2:
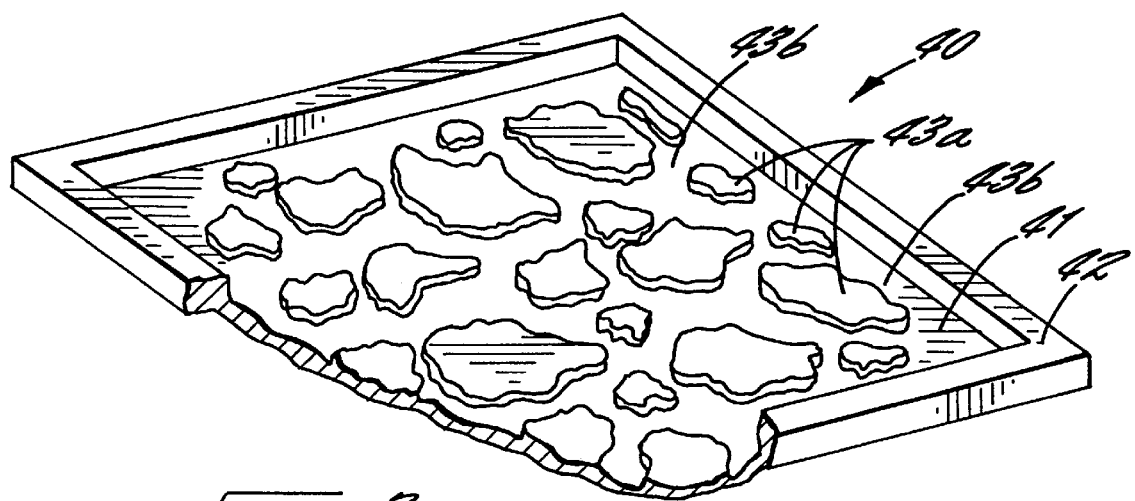
FIG. 2 is a perspective view of a mold used in connection with making a decorative article according to the present invention.

Referring now to FIG. 1, a process for making a decorative article of manufacture according to the present invention is schematically illustrated. The process includes: casting (Block 10) multiple layers of resin into a mold, curing (Block 12) the resin of each layer to form a laminate, removing (Block 14) the laminate from the mold, and subjecting (Block 16) the out-of-mold surface of the laminate to conditions to expose portions of each layer of resin.

The exposed portions of the layers of resin provide a decorative article of manufacture having a face layer with a desired aesthetic characteristic. Desired aesthetic characteristics include a substantially planar, multi-color surface, a profile such as a bas-relief, various color effects and the like.

Exemplary decorative articles produced by the above process include architectural facing, exterior and interior wall panels, counter tops, tabletops and the like. As would be understood by those having skill in the art, a plurality of the decorative articles may be installed on walls, ceilings, and floors to simulate a continuous ceramic tile surface. Decorative articles may be produced to simulate almost any type of surface and may have almost any pattern and color scheme desired when produced according to the processes of the present invention.

Referring now to FIGS. 2–6B, a method of making a decorative article of manufacture, according to one aspect of the present invention, is illustrated. A mold 40, illustrated in FIG. 2, includes a base 41 and a continuous side edge 42 defining an area into which multiple layers of curable thermosetting resin may be applied. The mold 40 may further include a top (not shown) for facilitating the application of heat and pressure to cure the thermosetting resin(s) in the mold, as would be understood by those having skill in the art. See, for example, U.S. Pat. No. 5,166,230 to Stecker, which is incorporated herein by reference in its entirety.

The base 41 of mold 40 is square in the illustrated embodiment; however, as would be understood by those having skill in the art, other sizes and shapes may be utilized. In the illustrated embodiment, raised portions 43a comprise a decorative pattern. The raised portions 43a may have any shape, pattern, and height desired. Preferably, the base 41 of the mold 40 is recessed by an equal amount throughout the decorative pattern.

The mold 40 may be made from a variety of materials such as aluminum, polyethylene, silicone or fiberglass composite and may be cast or machined to produce the decorative pattern, as would be known to those skilled in the art. In addition, the mold 40 may be formed from flexible material. Preferably, the mold 40 is provided with a release coating (not shown) such as a silicon release agent, a wax in the carnauba wax family, TEFLON® (a trademark of the E. I. DuPont de Nemours Company, Wilmington, Del.), zinc stearate, or any similar material which will function as a release agent for the particular resin material being used to create the decorative article, the selection of which is within the skill of one in the art.

The mold 40, including base 41 and the decorative pattern thereon, may be designed and created under computer control. Preferably, the decorative pattern for each article is designed and stored on a computer. In addition, the processes or portions thereof described herein may be under computer control. For patterns and designs which do not lend themselves to computer-assisted machining, traditional mold and pattern making methods can be used. Sculpting and texture transfer to silicone molds are examples.

Figure 3:
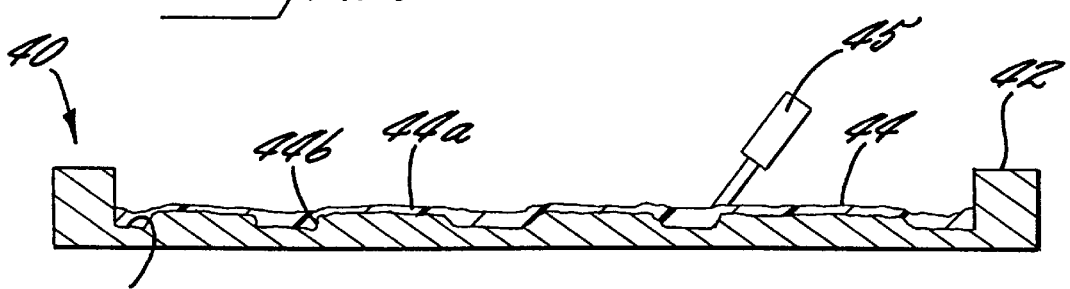
FIG. 3 is a cross-sectional view of the mold in FIG. 2 having a first curable thermosetting resin applied thereto.
Figure 4A:
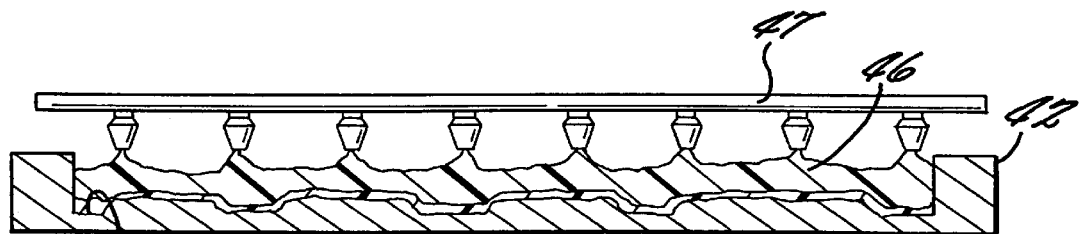
FIGS. 4A, 4B illustrate applying a second resin to the out-of-mold surface of the first resin.
Figure 4B:
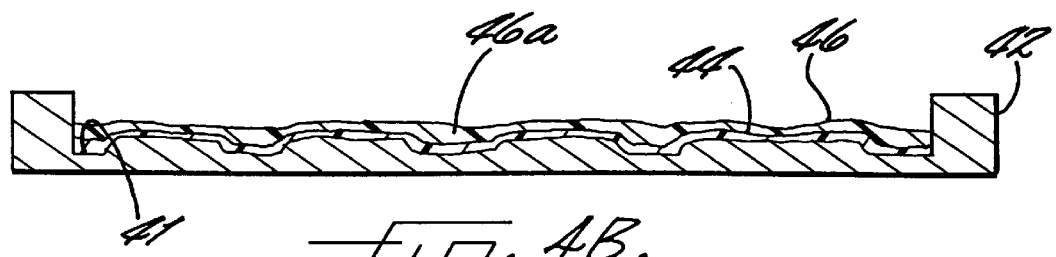

Referring now to FIG. 3, a first layer of curable thermosetting resin 44 is applied to the base 41 via a nozzle 45 or any other known means of applying resin. Throughout the processes of the present invention, resin may be applied in various ways, and is not limited to the applicators schematically illustrated in the drawings. The first resin layer 44 has an out-of-mold surface 44a with relief portions therein generally following the relief portions 43b of the mold 40 created by the raised portions 43a. Referring now to FIG. 4A, a second curable thermosetting resin layer 46 is cast onto the out-of-mold surface 44a of the first resin layer 44 using applicators 47. The second layer of resin 46 has an out-of-mold surface 46A, as shown in FIG. 4B, with relief portions therein. The second resin layer 46 is preferably a different color from that of the first resin layer 44.

Figure 5A:
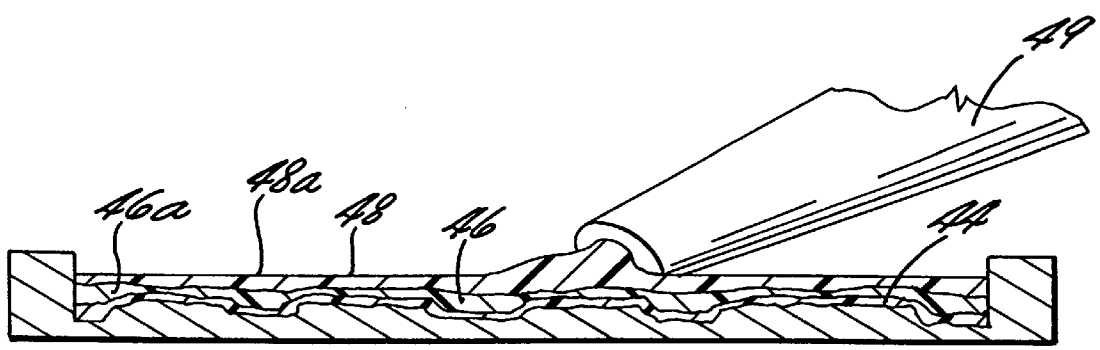
FIGS. 5A, 5B illustrate applying a third resin to the out-of-mold surface of the second resin.
Figure 5B:
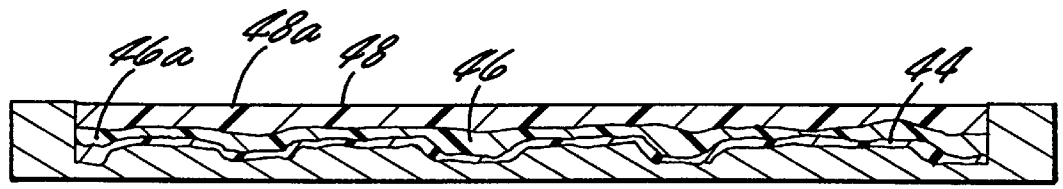

Referring now to FIGS. 5A, 5B a third curable thermosetting resin layer 48 is cast onto the out-of-mold surface 46A of the second resin layer via applicator 49. The third resin layer 48 generally follows the relief portions in the out-of-mold surface 46A of the second resin layer 46. The third resin layer 48 has an out-of-mold surface 48a that is substantially planar, as illustrated. Preferably, the third resin layer 48 has a color different from both the first resin layer 44 and second resin layer 46. The first, second and third resin layers 44,46,48 form a laminate 50 of multi-colored resin layers.

Alternatively, a solid panel of material may be used in lieu of the third resin layer 48. The first and second resin layers 44,46, upon full or partial curing, may be removed from the mold 40 and placed on a solid panel of material. Virtually any type of material may be used for this purpose. For example, a solid panel of polyvinylchloride or other similar material may be used, the selection of which will be readily apparent to one skilled in the art.

Curing (Block 12) the thermosetting resins of the laminate 50 is the next step. Curing the thermosetting resins preferably takes place using conventional techniques, as described in the above-referenced U.S. Pat. No. 5,166,230 to Stecker. Curing may occur at room temperature, for example between about 15° C. and 38° C., or at elevated temperatures, for example, between about 100° C. and 150° C. The specific curing temperature and curing time may vary and will depend upon the particular resin or resins cast and is information which is well known in the art. In addition, a full curing step or partial curing step may occur after each step of applying a resin layer.

Figure 6A:
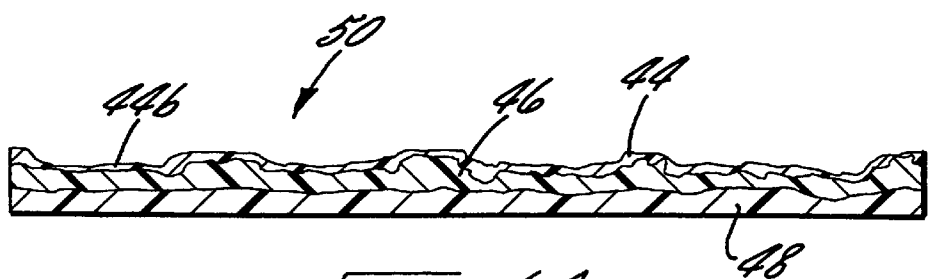
FIG. 6A illustrates the multi-layered article of FIGS. 5A, 5B removed from the mold.
Figure 6B:
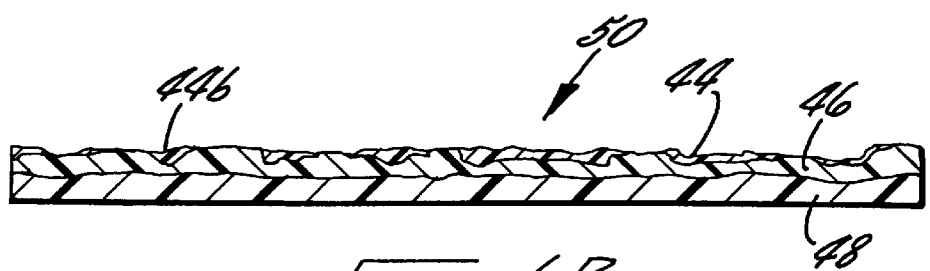
FIG. 6B illustrates subjecting the in-mold surface of the multi-layered article of FIGS. 5A, 5B after being sanded to expose the first and second layers of resin.

After sufficient curing time, the thermosetting resin layers 44,46,48 are substantially polymerized. As illustrated in FIGS. 6A,6B, the multi-layered laminate 50, is removed from the base 41 for cooling and further processing. After removal from the base 41, the laminate 50 may be placed between wooden sheets or other flat substrates (not shown) to help maintain flatness during cooling. The surface portion of the first resin layer 44, which is in contact with the base 41, is referred to as the in-mold surface 44b. The in-mold surface 44b comprises the molded inverse pattern corresponding to the pattern of raised portions 43a of the base 41. As one having skill in the art would understand, the raised portions of the in-mold surface 44b correspond with the recessed portions 43b of the base 41.

The first resin layer 44 may be formed from a resin having superior physical properties as compared with the underlying resin layers 46,48. In some cases, it may not be necessary for the underlying layers to have the functional or aesthetic qualities of the first resin layer 44. Typically, the only requirement of the final layer (the third resin layer 48 in the illustrated embodiment), is that the out-of-mold surface 48a be substantially parallel to the opposing in-mold surface 44b and be generally smooth to enable the laminate 50 to be adhesively attached to another surface such that a plurality of laminates together give the appearance of a continuous surface.

An important advantage of forming a multi-layer laminate 50 as illustrated, is that desired material properties can be achieved at a lower cost than if a single layer of resin is used. For example, the first resin layer 44 can be a relatively thin layer of relatively high-priced resin having the desired physical properties for the exposed face layer. Underlying resin layers, such as the second and third resin layers 46,48, can be lower-priced resins having generally lower quality relative to the first resin layer 44. In addition, the underlying layers may be fiber-reinforced to provide additional strength to the article. Consequently, each article can have desired physical properties by using different resins in the outer, or face layer, than in the underlying layer or layers.

The preparation of curable thermosetting resins is well known in the art and generally involves mixing resins with various filler materials, fiber reinforcement, appropriate catalysts, and desired tinting or pigment materials, referred to as a resin system. Preferred filler materials, such as alumina, trihydrate and/or glass fibers, are selected to impart desired properties to a thermosetting resin. Each layer of resin also has a different color pigment mixed therein. Preferably, the mixing of the thermosetting resins for use in the above process includes mixing under vacuum to remove any air entrapped by the mixing process.

Figure 15:
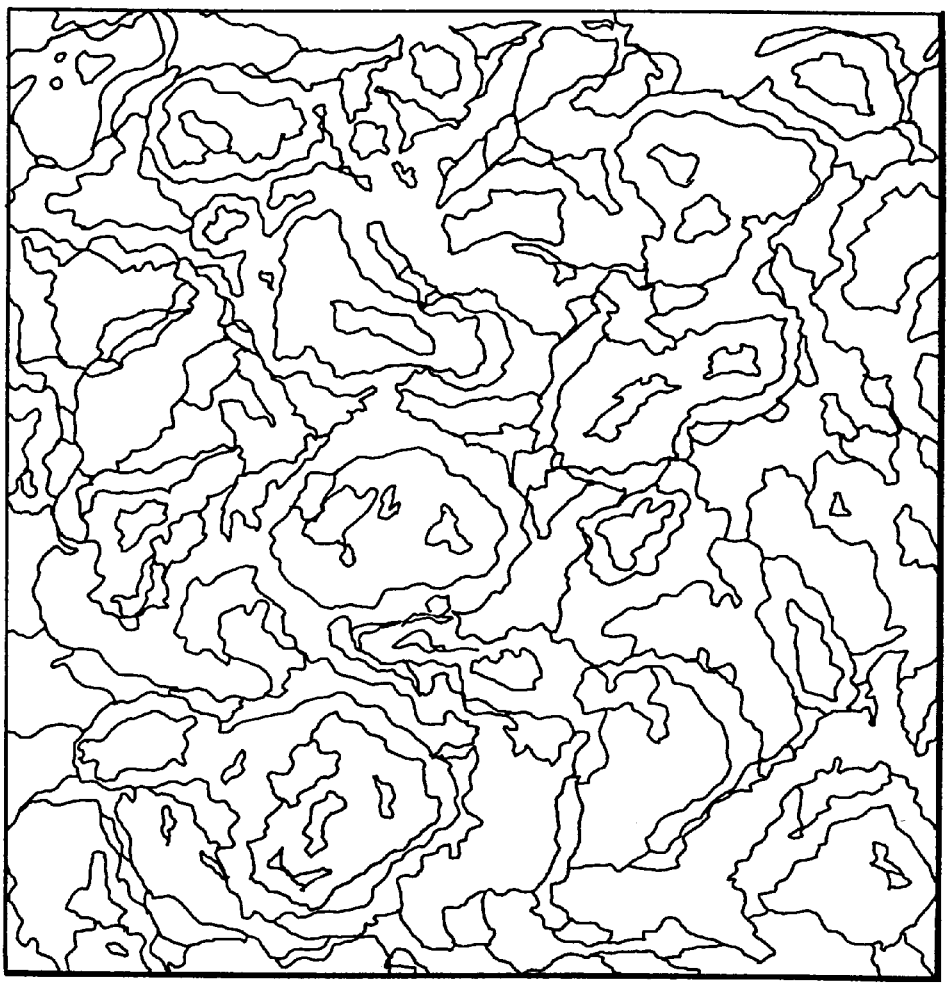
FIG. 15 is a top plan view of the decorative article of FIG. 14B illustrating the exposed portions of the underlying resin layers.

Referring now to FIGS. 6A, 6B, the final step of the illustrated process involves subjecting the in-mold surface 44B to sanding or other treatment sufficient to expose portions of the first, second and third resin layers 44, 46, 48. An exemplary finished product is illustrated in FIG. 15. The face surface of the finished article has portions of each layer exposed to produce the desired design.

Figure 7:
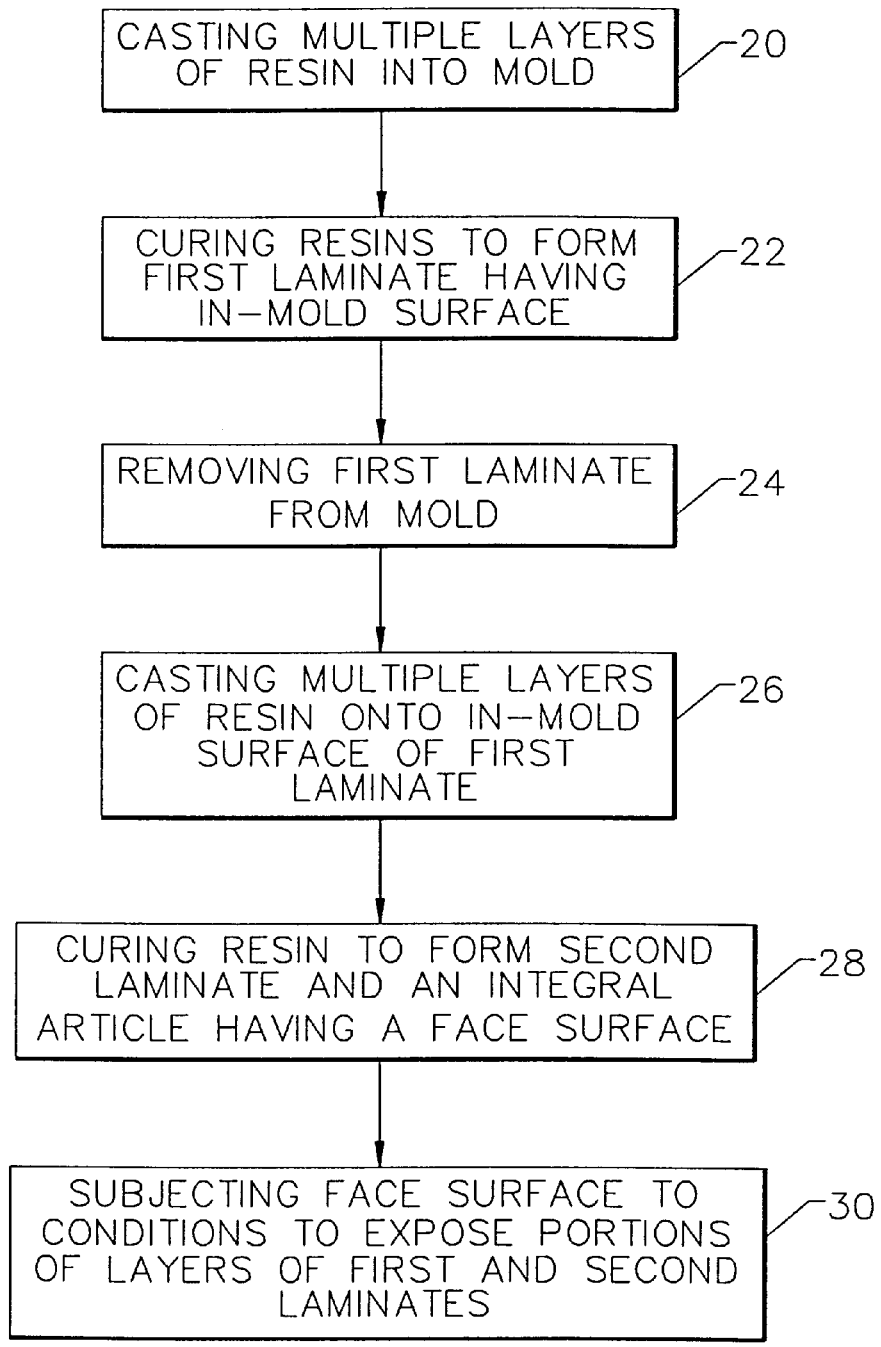
FIG. 7 is a flow diagram illustrating the steps of a method of making a decorative article according to another aspect of the present invention.

Referring now to FIG. 7, a method of producing a decorative article of manufacture, according to another aspect of the present invention is schematically illustrated. The method comprises: casting (Block 20) multiple layers of thermosetting resin into a mold, curing (Block 22) the multiple layers of resin to form a first laminate, removing (Block 24) the first laminate from the mold, casting (Block 26) multiple layers of thermosetting resin onto the in-mold surface of the first laminate, curing (Block 28) the multiple layers of resin to form a second laminate and an integral article having a face surface, and subjecting (Block 30) the face surface to conditions sufficient to expose layers of the first and second laminates.

Figure 8:
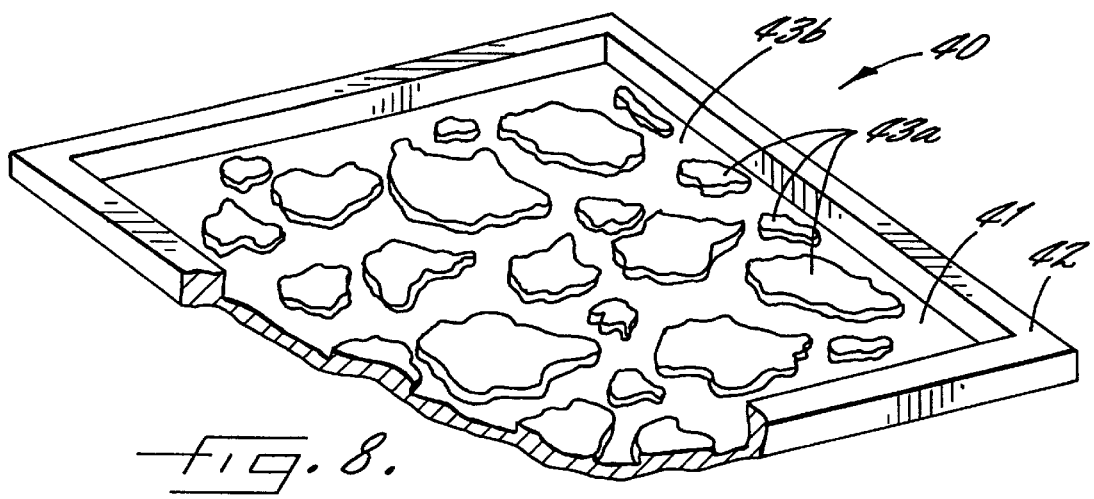
FIG. 8 illustrates a mold for making a decorative article according to another aspect of the present invention.

Referring now to FIG. 8, a mold 40, similar to that described above, includes a base 41, a plurality of raised portions 43a, a plurality of recessed portions 43b and a continuous side edge 42 defining an area into which at least one curable thermosetting resin may be applied. As described above, the casting part 40 may further comprise a top (not shown) for facilitating the application of heat and pressure to cure the thermosetting resins contained therein.

Figure 9:
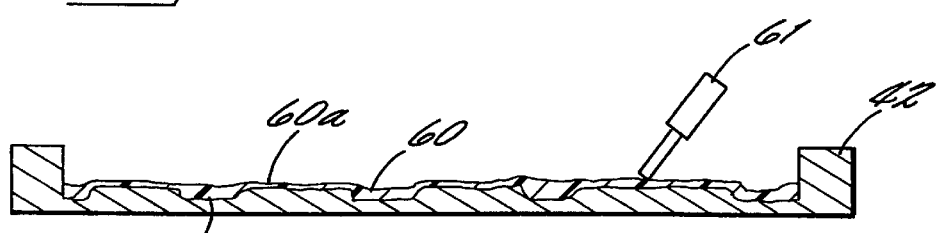
FIG. 9 is a cross-sectional view of the mold of FIG. 8 illustrating the application of a first layer of resin.

Referring now to FIG. 9, a first layer 60 of thermosetting resin is cast into the base 41 of the mold 40 via applicator 61. The first layer 60 has an in-mold surface 60B following the relief portions 43b of the mold 40 and has an opposing out-of-mold surface 60a, as illustrated.

Figure 10:
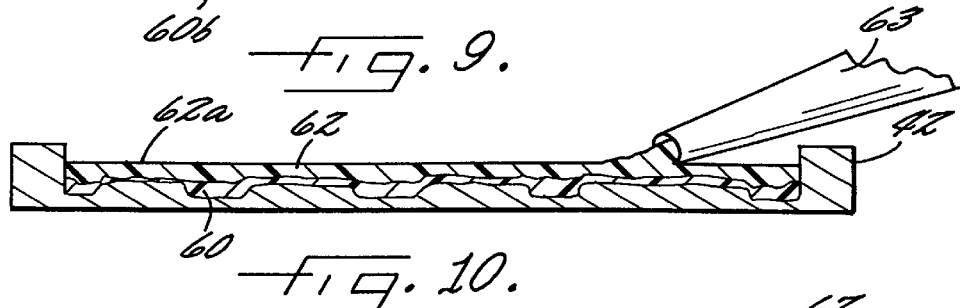
FIG. 10 illustrates the application of a second layer of resin to the out-of-mold surface of the first layer applied in FIG. 9.

Referring now to FIG. 10, a second layer 62 of a second curable thermosetting resin is cast onto the out-of-mold surface 60a of the first layer 60 via applicator 63. The second layer 62 has an out-of-mold surface 62a that is substantially planar, as illustrated. The first and second resin layers 60,62 are then cured to form a first laminate 65. However, as described above, each layer of resin 60,62 may be individually cured (fully or partially) after application.

Alternatively, a solid panel of material may be used in lieu of the second resin layer 62. The first resin layer 60, upon full or partial curing, may be removed from the mold 40 and placed on a solid panel of material to produce a first laminate 65. Virtually any type of material may be used for this purpose.

Figure 11A:
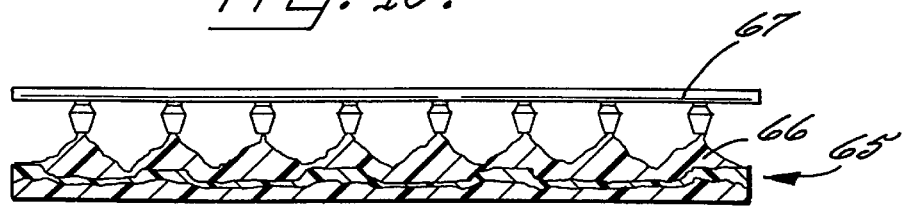
FIGS. 11A, 11B illustrate applying a third resin to the in-mold surface of the first resin illustrated in FIGS. 9 and 10.
Figure 11B:
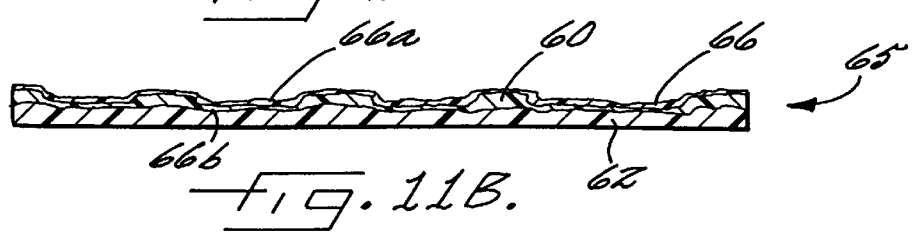

After curing, the first laminate 65 is removed from the mold 40 as illustrated in FIGS. 11A, 11B. A third layer 66 of a third curable thermosetting resin is cast onto the in-mold surface 60b of the first layer 60 of the first laminate 65. The third layer 66 generally follows the relief portions in the in-mold surface 60b, and has a face surface with corresponding relief portions therein. In addition, the third resin layer 66 has a color different from both the first and second resin layers 60,62.

Figure 12A:
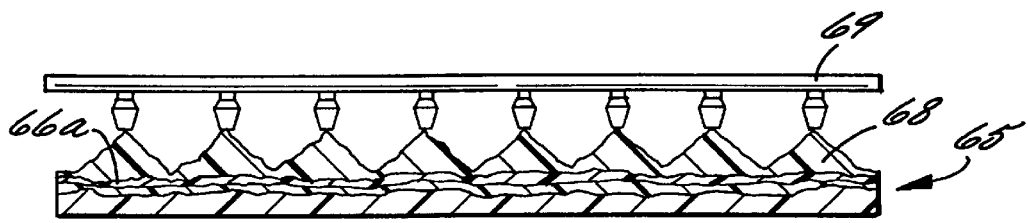
FIGS. 12A, 12B illustrate applying a fourth resin to the out-of-mold surface of the third resin layer of FIGS. 11A, 11B.
Figure 12B:
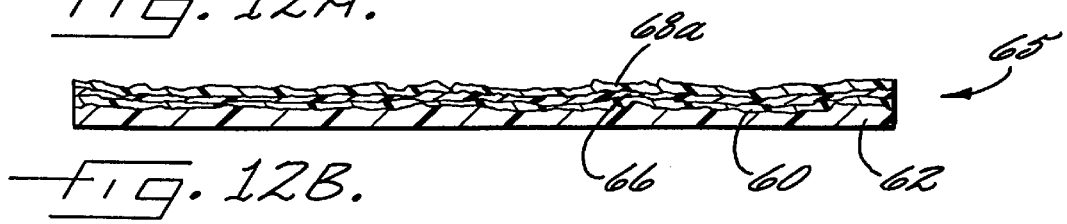

Referring now to FIGS. 12A, 12B a fourth layer 68 of a fourth curable thermosetting resin is cast via applicator 69 onto the face layer 66a of the third resin layer 66 to follow the relief portions therein, and has a face surface 68a with corresponding relief portions therein. Furthermore, the fourth resin layer 68 has a color different from the first, second, and third resin layers 60,62,66.

Figure 13A:
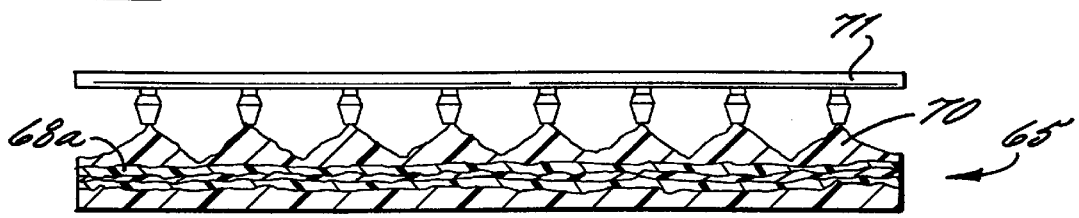
FIGS. 13A, 13B illustrate applying a fifth resin layer to the out-of-mold surface of the fourth resin layer of FIGS. 12A, 12B.
Figure 13B:
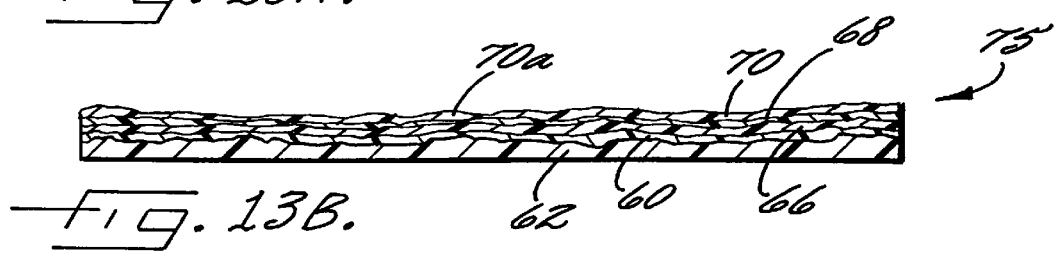

Referring now to FIGS. 13A, 13B, a fifth layer 70 of curable thermosetting resin is applied via applicator 71 to the face surface 68a of the fourth resin layer 68. The fifth layer 70 has a face surface 70a with relief portions therein that generally follow the relief portions in the face surface 68a of the fourth layer 68. The fourth resin layer 70 has a color different from the first, second, third, and fourth resin layers 60,62,66,68. Following the application of the fifth layer 70, the third, fourth, and fifth layers 66,68,70 of thermosetting resin are cured as described above, resulting in a multi-layered decorative article 75.

Figure 14A:
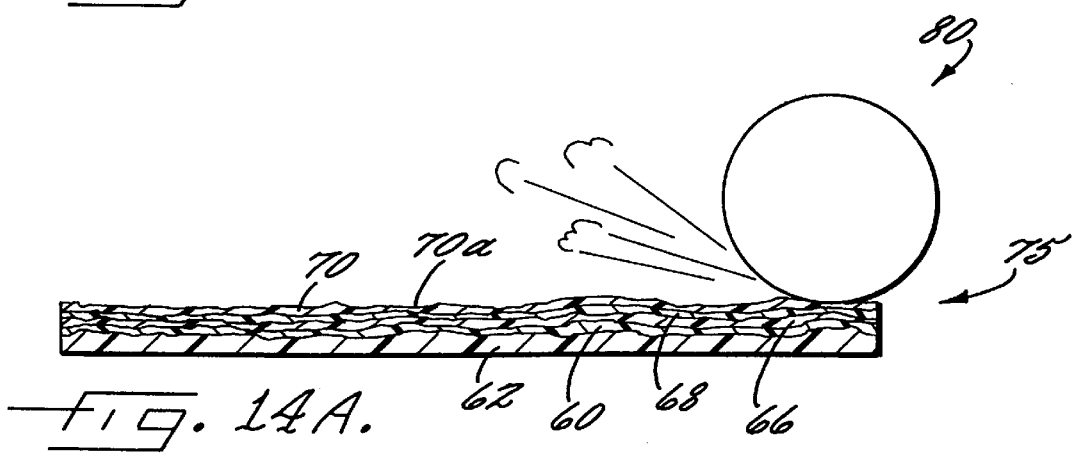
FIG. 14A illustrates subjecting the face surface of the article illustrated in FIG. 13B to conditions sufficient to expose portions of the underlying layers.
Figure 14B:
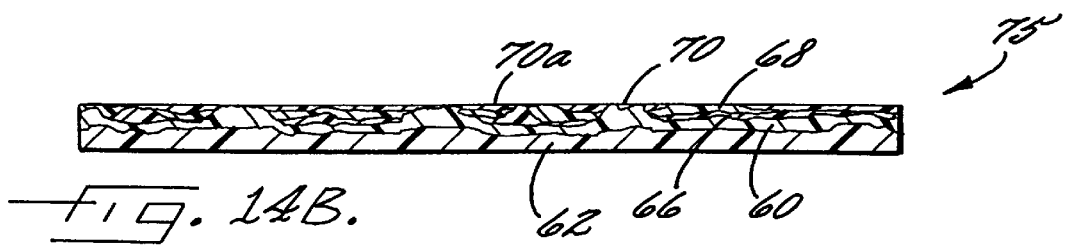
FIG. 14B is a cross-sectional view of the article of FIG. 14A illustrating the exposed portions of the resin layers.

Referring now to FIGS. 14A,14B, the decorative article 75 is subjected to conditions sufficient to expose portions of the layers therein. In particular, the face surface 70a of the fifth layer of resin is sanded to expose portions of the underlying layers. Portions of all of the underlying layers may be exposed, or portions of only some of the underlying layers may be exposed depending on the desired aesthetic characteristic to be achieved. Although a circular sanding device 80 is schematically illustrated, the decorative article 75 may be sanded by planar-type devices, as would be known to those having skill in the art. An exemplary finished product is illustrated in FIG. 15. The face surface of the finished article has portions of each layer exposed to produce the desired design.

Although a variety of resin materials will function satisfactorily, the resin materials should preferably be a thermosetting resin. The term "thermosetting resin" relates to a polymer that solidifies or "sets" irreversibly on heating. Suitable thermosetting resins include polyesters, epoxies, urethanes, or any other similar resins preferably having various volatile components which cure without releasing solvents and/or gases therein. It is recognized that some polymers although technically "thermoplastics" could be used in the present invention with the proviso that they do not flow under conditions to which the article is typically subjected and the cured resin can be post finished such as sanding. Exemplary polymers of this type are the acrylics and vinyls.

The thermosetting resins useful herein can vary and include unsaturated polyesters, phenolics, epoxies, polyurethanes, and the like, and mixtures and blends thereof. The unsaturated polyester resins are a particularly preferred resin. Useful unsaturated polyester resins include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexandediol, 1,7-heptanediol, 1,8-octanediol, 1,9-nonanediol, 1,10-decanediol, 2,10-decanediol, 1,4-cyclohexandediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3-3,-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1--cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like.

The amount of polyester thermosetting resin in the resin system ranges from about 35 percent to about 100 percent by weight of the total resin system. The amount of crosslinking monomer is about 10 percent to about 65 percent by weight of the resin system.

The polyester resin can also be mixed or blended with other thermosetting resins. For example, the polyester resin can be mixed with a crosslinking polyurethane such as described in U.S. Pat. No. 4,062,826 to Hutchinson et al., the disclosure of which is incorporated herein by reference. Polymerization of this mixture can occur by a condensation reaction. A homogenous mixture of an unsaturated polyester resin and a crosslinkable polyurethane precursor having at least one free isocyanate group to react with the end groups of the polyester resin is formed. For example, a crosslinkable polyurethane comprising at least one polyfunctional compound containing groups reactive with isocyanate groups and at least one polyisocyanate can be used. The isocyanate is activated by the first reaction conditions and the chain extension reaction takes place to partially polymerize the resin blend to a semi-solid mass. Exemplary polyisocyanates include methylene di-p-phenylene isocyanate ("MDI") isophorone diisocyanate ("IPDI") and toluene diisocyanate ("TDI"). The second reaction conditions can be activating additional polyisocyanate to fully polymerize the resin blend or can be activating a free radical initiator in the blend to fully polymerize the same. The use of other thermosetting resins will be within the skill of one in the art.

Exemplary room temperature free radical initiators include hydrogen peroxide and methyl ethyl ketone peroxide ("MEKP") noting that most commercially available MEKP includes some hydrogen peroxide.

Exemplary peroxy-type free radical polymerization initiators are the hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. Also azo promoters such as azobisbutrylnitrile can be used. The amount of first and second curing agents used is dependent on the time desired for thermosetting, but is typically a short period of time (i.e., less than 3 hours, typically less than 2 hours and often less than 1 hour). The amount used is about 0.01 to about 0.1 percent by weight of the first curing agent and about 0.1 to about 5 percent by weight of the second curing agent.

The resin system can also include various additives commonly employed in thermosetting resin compositions such as fillers, colorants, veining pigments, thixotropic agents, chemical thickening agents, casting part release agents, low profile additives, fiber reinforcement, and other additives for imparting desirable properties such as hardness, color, flame retardancy, aesthetic appearance, smoothness, clarity and the like. Fibers added may include glass, carbon, metals, and the like. Additionally, resins may be selected having a degree of translucency allowing the colors of other resins used to be visible. A variety of desired aesthetic characteristics can be achieved by selecting resins having different colors and properties, as would be understood by those having skill in the art.

Exemplary fillers can include, among others, alumina trihydrate, quartz powder, marble powder, crushed silica, calcium carbonate, clay, glass fibers, powdered metals, mixtures thereof and other mineral and inorganic particulates that contribute to the aesthetics of the final article. The fillers are used in amounts of about 20 to about 300 percent by weight of resin.

Various colorants and veining pigments can be added for purposes of providing background color and other aesthetically pleasing features to the resin system and shaped article. For example, tinting pigments such as titanium dioxide and the like can be added or a trace amount of carbon black can be swirled in to contribute to the marble-like appearance. The amount used is typically less than about 3 percent by weight.

Thixotropic agents are agents which cause the viscosity of the resin system to vary as a function of its state of agitation and the previous history of motion within the fluid. These agents are preferably used to maintain the filler and other additives in suspension while the resin is curing. Generally, the viscosity of a thixotropic fluid decreases as its state of agitation and length of agitation increases, and increases as its state of agitation and length of agitation decreases. An exemplary thixotropic agents is fumed silica. The amount used is typically less than about 1 percent by weight.

Exemplary chemical thickening agents are hydroxides of metals of Group I, II, and IV of the periodic table such as magnesium oxide, calcium oxide, zinc oxide, magnesium hydroxide, calcium hydroxide, and the like. The thickeners are used in amounts of about 0.5 to about 10 percent by weight, and preferably in amounts of about 1 to about 5 percent by weight.

Other additives can include flame retardants, antioxidants, inhibitors (e.g., hydroquinone and benzoquinone), UV radiation absorbers and the like.

The present invention and its advantages over the prior art will be more fully understood and appreciated from the illustrative examples which follow. It is to be understood that the examples are for the purpose of illustration and is not intended as being limiting upon the scope of the invention. A person skilled in the applicable arts will appreciate from these examples that this invention can be embodied in many different forms other than as is specifically disclosed.

What is claimed is:

1. A process for making a decorative article of manufacture, the process comprising the steps of:

(a) casting into a mold having relief portions therein a first layer of a first curable thermosetting resin, said first layer having an in-mold surface following the relief portions of the mold and an opposing out-of-mold surface;

(b) casting a second layer of a second curable thermosetting resin onto the out-of-mold surface of the first layer, said second layer having a generally planar out-of-mold surface, said second resin having a color different from said first resin;

(c) curing the first and second resins, thereby forming a first laminate;

(d) removing the first laminate from the mold;

(e) casting a third layer of a third curable thermosetting resin onto the in-mold surface of the first layer of the first laminate to follow the relief portions therein, said third layer having a face surface with relief portions therein, said third resin having a color different from said first and second resins;

(f) casting a fourth layer of a fourth curable thermosetting resin onto the face surface of the third layer to follow the relief portions therein, said fourth layer having a face surface with relief portions therein, said fourth resin having a color different from said first, second, and third resins;

(g) curing the third and fourth thermosetting resins; and (h) exposing portions of the first, third, and fourth layers.

2. A process according to claim 1 wherein said first, second, third, and fourth resins are selected from the group consisting of unsaturated polyesters, epoxies, phenolics and polyurethanes, and blends and mixtures thereof.

3. A process according to claim 1 wherein said first, second, third, and fourth resins are the same resin.

4. A process according to claim 1 wherein step (h) includes sanding the face surface of the fourth layer to expose portions of the first, third, and fourth layers.

5. A process according to claim 1 wherein step (c) includes heating the first and second resins to a temperature of about 100 to 150° C. at 80 to 1000 psi.

6. A process according to claim 1 a wherein step (c) includes curing the first and second resins at a temperature of between 15° C. and 38° C.

7. A process according to claim 1 wherein step (g) includes heating the third and fourth resins to a temperature of about 100 to 150° C. at 80 to 1000 psi.

8. A process according to claim 1 wherein step (g) includes curing the third and fourth resins at a temperature of between 15° C. and 38° C.

9. A process for making a decorative article of manufacture, the process comprising the steps of:
   (a) casting into a mold having relief portions therein a plurality of curable thermosetting resins, each of said plurality of resins forming a respective layer following the relief portions, each of said plurality of layers having a different color;
   (b) curing the plurality of resins from step (a) into a first laminate with a substantially planar out-of-mold surface and an opposing in-mold surface having relief portions therein;
   (c) removing the first laminate from the mold;
   (d) casting onto the first laminate in-mold surface a plurality of layers of curable thermosetting resin to follow the relief portions, each one of said plurality of layers having a color different from other layers;
   (e) curing the plurality of resins from step (d) into a second laminate, said first and second laminates forming an integral article having a face surface with relief portions therein and an opposing substantially planar back surface; and
   (f) exposing portions of the layers of said first and second laminates.

10. A process according to claim 9 wherein the resins are selected from the group consisting of unsaturated polyesters, epoxies, phenolics and polyurethanes, and blends and mixtures thereof.

11. A process according to claim 9 wherein the resins are the same resin.

12. A process according to claim 9 wherein step (f) includes sanding the face surface of the article to expose portions of the layers of the first and second laminates.

13. A process according to claim 9 wherein step (b) includes heating the resins to a temperature of about 100 to 150° C. at 80 to 1000 psi.

14. A process according to claim 9 wherein step (b) includes curing the resins at a temperature of between 15° C. and 38° C.

15. A process according to claim 9 wherein step (e) includes heating the resins to a temperature of about 100 to 150° C. at 80 to 1000 psi.

16. A process according to claim 9 wherein step (e) includes curing the resins at a temperature of between 15° C. and 38° C.

17. A process for making a decorative article of manufacture, the process comprising the steps of:
   (a) casting into a mold having relief portions therein a first layer of a first curable thermosetting resin, said first layer having an in-mold surface following the relief portions of the mold and an opposing out-of-mold surface;
   (b) placing a solid panel onto the out-of-mold surface of the first layer, said solid panel having a generally planar out-of-mold surface, said first layer and solid panel defining a first laminate;
   (c) curing the first resin;
   (d) removing the first laminate from the mold;
   (e) casting a second layer of a second curable thermosetting resin onto the in-mold surface of the first layer of the first laminate to follow the relief portions therein, said second layer having a face surface with relief portions therein, said second resin having a color different from said first resin;
   (f) casting a third layer of a third curable thermosetting resin onto the face layer of the second layer to follow the relief portions therein, said third layer having a face surface with relief portions therein, said third resin having a color different from said first and second resins;
   (g) curing the second and third thermosetting resins; and
   (h) exposing portions of the first, second, and third layers.

18. A process according to claim 17 wherein said solid panel is formed from polyvinyl chloride.

* * * * *